(12) United States Patent
Bose et al.

(10) Patent No.: US 10,198,462 B2
(45) Date of Patent: Feb. 5, 2019

(54) CACHE MANAGEMENT

(75) Inventors: Miko Arnab Sakhya Singha Bose, Seattle, WA (US); Simon Clarke, Seattle, WA (US); David Charles Oliver, Bellevue, WA (US); Malgorzata Anna Malaczek, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 503 days.

(21) Appl. No.: 13/439,873

(22) Filed: Apr. 5, 2012

(65) Prior Publication Data

US 2013/0268614 A1 Oct. 10, 2013

(51) Int. Cl.
*G06F 15/167* (2006.01)
*G06F 17/30* (2006.01)

(52) U.S. Cl.
CPC ........ *G06F 17/3033* (2013.01); *G06F 15/167* (2013.01); *G06F 17/3048* (2013.01)

(58) Field of Classification Search
CPC . G06F 17/3048; G06F 17/3033; G06F 15/167
USPC ........................................ 709/213, 217, 219
See application file for complete search history.

(56) References Cited

U.S. PATENT DOCUMENTS 6,772,225 B1  8/2004  Jennings, III et al.
7,093,085 B2 * 8/2006  Lee ...................... H04L 1/0041
                                                      365/230.03
7,600,125 B1 * 10/2009 Stringham .......... G06F 11/1004
                                                      380/229

(Continued)

FOREIGN PATENT DOCUMENTS

CN      102067557 A    5/2011
JP       10177510 A    6/1998

(Continued)

OTHER PUBLICATIONS

Blomer, et al., "A Fully Decentralized File System Cache for the CernVM-FS", Retrieved at «http://ieeexplore.ieee.org/stamp/stamp.jsp?arnumber=05560054», Proceedings of 19th International Conference on Computer Communications and Networks (ICCCN), Aug. 2-5, 2010, pp. 1-6.

(Continued)

*Primary Examiner* — David R Lazaro
*Assistant Examiner* — Mariegeorges A Henry
(74) *Attorney, Agent, or Firm* — Schwegman, Lundberg & Woessner, P.A.

(57) ABSTRACT

Concepts and technologies are described herein for cache management. In accordance with the concepts and technologies disclosed herein, the server computer can be configured to communicate with a client device configured to execute a cache module to maintain a cache storing data downloaded from and/or uploaded to the server computer by the client device. The server computer can be configured to receive requests for data stored at the server computer. The server computer can be configured to respond to the request with hashes that correspond to the requested data. The client device can search the cache for the hashes, obtain the data from the cache if the hashes are found, and/or download the data from the server computer if the hashes are not found. The client device also can be configured to update the cache upon uploading the data to the server computer.

18 Claims, 5 Drawing Sheets

(56) References Cited

U.S. PATENT DOCUMENTS

| | | | |
|---|---|---|---|
| 7,895,338 B2 | 2/2011 | Leaute et al. | |
| 7,970,923 B2* | 6/2011 | Pedersen | H04L 63/0272 709/219 |
| 8,499,120 B2* | 7/2013 | Furuhjelm | G06F 12/0866 711/118 |
| 8,863,204 B2* | 10/2014 | Whyte | H04N 21/222 709/219 |
| 8,874,697 B2* | 10/2014 | Shah | H04L 12/584 707/679 |
| 2003/0055889 A1* | 3/2003 | Chen | H04N 21/643 709/203 |
| 2003/0236858 A1 | 12/2003 | Nishiyama et al. | |
| 2004/0148434 A1 | 7/2004 | Matsubara et al. | |
| 2005/0015471 A1* | 1/2005 | Zhang | H04L 63/0442 709/221 |
| 2006/0136485 A1* | 6/2006 | Yared et al. | 707/102 |
| 2007/0150577 A1 | 6/2007 | Lowery et al. | |
| 2007/0260701 A1 | 11/2007 | Thomason | |
| 2008/0040420 A1 | 2/2008 | Twiss et al. | |
| 2008/0082648 A1* | 4/2008 | Ahmed | H04L 63/126 709/223 |
| 2009/0157811 A1* | 6/2009 | Bailor | G06F 17/30168 709/204 |
| 2009/0319473 A1* | 12/2009 | Rao et al. | 707/2 |
| 2009/0327505 A1 | 12/2009 | Rao et al. | |
| 2010/0030871 A1* | 2/2010 | Jolly | G06F 17/30 709/219 |
| 2010/0115205 A1* | 5/2010 | Brown et al. | 711/135 |
| 2010/0174939 A1* | 7/2010 | Vexler | G06F 17/3048 714/5.1 |
| 2011/0238828 A1 | 9/2011 | Grigsby et al. | |
| 2012/0005431 A1* | 1/2012 | Gross et al. | 711/130 |
| 2012/0089700 A1* | 4/2012 | Safruti | H04L 67/2842 709/217 |

FOREIGN PATENT DOCUMENTS

| | | |
|---|---|---|
| JP | 2001014209 A | 1/2001 |
| JP | 2004185263 A | 7/2004 |
| JP | 2005501355 A | 1/2005 |
| JP | 2009181344 A | 8/2009 |
| JP | 2011525278 A | 9/2011 |

OTHER PUBLICATIONS

Ari, et al., "Caching Support for Push-Pull Data Dissemination using Data-Snooping Routers", Retrieved at «http://ieeexplore.ieee.org/stamp/stamp.jsp?tp=&arnumber=1316085», Parallel and Distributed Systems, ICPADS, Jul. 7-9, 2004, pp. 101-108.

Davison, B.D., "A Web Caching Primer", Retrieved at «http://ieeexplore.ieee.org/stamp/stamp.jsp?tp=&arnumber=939449», Internet Computing, IEEE, 5(4), Jul.-Aug. 2001, pp. 38-45.

"International Search Report", dated Jul. 16, 2013, Application No. PCT/US2013/035048, Filed Date: Apr. 3, 2013, pp. 10.

Chinese Office Action dated Oct. 14, 2016 for Chinese Patent Application No. 201380018941.1, a counterpart foreign application of U.S. Appl. No. 13/439,873.

"Second Office Action Issued in Chinese Patent Application No. 201380018941.1", dated Jun. 26, 2017, 6 Pages.

"Office Action Issued in Japanese Patent Application No. 2015-504692", dated May 17, 2017, 9 Pages.

"Office Action Issued in European Patent Application No. 13717644.2", dated Apr. 4, 2018, 5 Pages.

"Third Office Action Issued in Chinese Patent Application No. 201380018941.1", dated Jan. 15, 2018, 13 Pages.

"Office Action Issued in Chinese Patent Application No. 201380018941.1", dated Jul. 9, 2018, 16 Pages.

"Oral Hearing Issued in European Patent Application No. 13717644.2", Mailed Date: Oct. 1, 2018, 7 Pages.

"Office Action Issued in Japanese Patent Application No. 2017-221774", dated Sep. 13, 2018, 6 Pages.

Henson, Valerie, "The Code Monkey's Guide to Cryptographic Hashes for Content-based Addressing", Retrieved from: https://www.networkworld.com/article/2288580/software/the-code-monkey-s-guide-to-cryptographic-hashes-for-content-based-addressing.html, Nov. 12, 2007, 6 Pages.

* cited by examiner

CACHE MANAGEMENT

BACKGROUND

Some organizations expend large amounts of resources obtaining and maintaining wide area networks ("WANs") between geographically distributed locations. For example, some organizations install and/or maintain expensive underground, over the air, and/or undersea connection media to support communications between the locations. In some instances, large amounts of bandwidth must be available to support operations at the locations and may be expensive to maintain, depending upon the medium chosen to support that bandwidth and/or the distance between the locations. While installing and maintaining these cables can be expensive, the notion of creating and hosting multiple data centers to serve the distributed locations can be even more expensive and therefore can be impractical. To address these and other concerns, some organizations employ incremental updating of files to reduce bandwidth needed between the various locations.

When incrementally updating files, computers can be configured to download data indicating incremental updates to files instead of downloading entire files and/or new versions of the files. While this approach may reduce the amount of data transmitted, the bandwidth consumed by users making incremental updates to various files still can be substantial. In particular, while the data reflecting the incremental changes may consume less data than an entire new version of the updated file, the size of the data reflecting these incremental changes nonetheless can be substantial. For example, an incremental update of a file can include embedding data in the file. The data embedded in the file can include, for example, video data, image data, or the like. Thus, the incremental update for this file may include the video, image, or other data, which can consume large amounts of bandwidth to distribute to users. Similarly, some types of data such as images and video may not be easily divided into incremental pieces and as such, it may be necessary to transmit the entire file corresponding to the images or video when any changes are made.

When a user accesses the server computer to obtain the incremental update, large amounts of data may be transmitted to the user. Furthermore, because data consumed by organizations often is distributed or consumed by multiple users, the incremental update may be distributed to a large number of users. Thus, the amount of bandwidth consumed by users to make the incremental update may still be substantial. For example, each user updating the file in the above scenario may download the video or image data that was embedded in the file and update their version of the file to include the now-embedded data. Such an "incremental" change, when multiplied by a large number of users, can consume large amounts of data and/or bandwidth and therefore can be expensive in terms of bandwidth, transmission time, or the like.

It is with respect to these and other considerations that the disclosure made herein is presented.

SUMMARY

Concepts and technologies are described herein for cache management. In accordance with the concepts and technologies disclosed herein, a server computer hosts a distributed cache management service ("cache service"). The server computer can be configured to communicate with one or more client devices and/or client peers at a branch office or other location. In some embodiments, each of the client devices and the client peers can execute a cache module to generate and/or maintain a cache. The cache can be used to store data downloaded from and/or uploaded to the server computer by one or more of the client devices and/or client peers. According to various embodiments, the cache is provided by a distributed cache associated with the devices at the branch office, and therefore can include memory devices and/or other storage devices associated with the various devices at the branch office. In some other embodiments, the cache is provided by a data storage element such as a database, a server computer, and/or other device at the branch office or other location.

The server computer and/or the cache service executed by the server computer can be configured to receive requests for data stored at the server computer. The request can include a request for hashes of the data. The server computer can also be configured to determine if the requestor and/or the server computer are configured for caching as described herein. If the server computer and the requestor are both configured for caching, the server computer can respond to the request with the hashes that correspond to the requested data. In some embodiments, the server computer is further configured to determine if providing the hashes is more or less efficient than providing the requested data, notwithstanding the request for the hashes. If providing the hashes will be less efficient than providing the data, the server computer can be configured to respond to the request for hashes with the data instead.

Otherwise, the server computer can respond to the request for hashes with the requested hashes. Upon receiving the hashes, the client device, the client peer, and/or another requestor can search the distributed cache ("cache") to determine if any user at the branch office or other location previously has accessed the data associated with the hashes. Thus, while the description herein refers to searching the cache, it should be understood that a cache library or other data also can be searched to determine if the hashes and/or the data are stored by one or more devices at the branch office or other location. If the hashes and/or data are determined to exist in the cache, the client device, client peer, or other requesting device can access the device that stores the data and obtain the data from that device. As such, the request for the data received at the server computer can be responded to with a hash that can be used to locate a local copy of the data instead of downloading the data from the server computer.

If the client device, the client peer, and/or other requestor does not identify the hash and/or the data in the cache, the requestor can respond to the server computer with another request. The second request can request the data from the server computer. In some embodiments, the second request includes or is accompanied by a request for a hash corresponding to the requested data. Thus, the requestor can be configured to store the data and/or the hashes at the cache. As such, embodiments of the concepts and technologies disclosed herein can include updating and/or maintaining the cache.

According to another aspect of the concepts and technologies disclosed herein, the devices at the branch office or other location can be configured to update the cache upon uploading the data to the server computer. Thus, for example, if a client device uploads an updated file to the server computer, the client device can be configured to request a hash corresponding to the data, receive the hash from the server computer, and store the hash in the cache and/or an associated cache library. As such, when a first requestor attempts to download the updated data, the hashes provided by the server computer can be found in the cache and the data can be obtained locally, without the operations described above for obtaining the data, the hashes, and/or storing the data and hashes in the cache.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
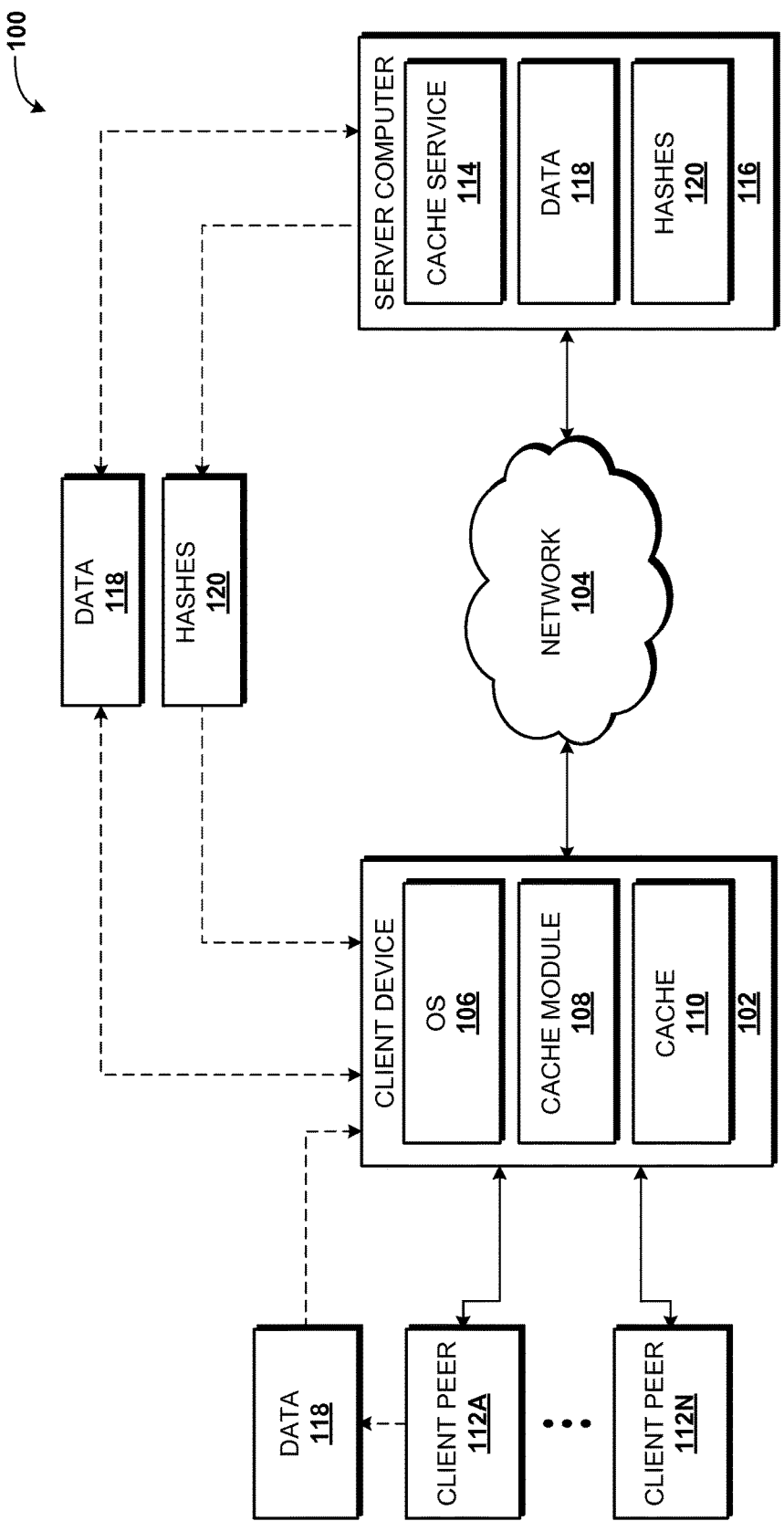
FIG. 1 is a system diagram illustrating an illustrative operating environment for the various embodiments disclosed herein.

The following detailed description is directed to concepts and technologies for cache management. According to the concepts and technologies described herein, a server computer hosts a cache management service ("cache service"). The server computer can be configured, via execution of the cache service, to communicate with one or more client devices and/or client peers at a branch office or other location with limited or constrained bandwidth. In some embodiments, one or more of the client devices or the client peers can be configured to execute a cache module. The cache module can be executable by the client devices and/or the client peers to generate and/or maintain a cache. The cache can be used to store data downloaded from and/or uploaded to the server computer by one or more of the client devices and/or client peers. According to various embodiments, the cache is provided by a distributed cache associated with the devices at the branch office or other location. As such, the functionality of the cache described herein can be provided by one or more memory devices or other storage devices associated with the various devices at the branch office. In some other embodiments, the functionality of the cache can be provided by a data storage element such as a database, a server computer, and/or other data storage device associated with the branch office or other location.

The server computer and/or the cache service executed by the server computer can be configured to receive requests for data stored at the server computer. The request can include and/or can be accompanied by a request for hashes corresponding to the data. The server computer can also be configured to determine if the requestor and/or the server computer are configured for caching. If the server computer and the requestor are configured for caching, the server computer can respond to the request with hashes that correspond to the requested data. The server computer can respond to the request for hashes with the requested hashes. In some embodiments, the server computer is further configured to generate the hashes and/or to determine if providing the hashes is less efficient than providing the requested data. If the server computer determines that providing the requested hashes will be less efficient than providing the data itself, the server computer can be configured to respond to the request for hashes with the data instead.

The client device, the client peer, and/or another requestor can search the cache to determine if any user at the branch office or other location previously has accessed the data associated with the hashes. While the description herein refers to searching the cache, it should be understood that a cache library or other data also can be searched to determine if the hashes and/or the data are stored by one or more devices at the branch office or other location. If the hashes and/or data are determined to exist in the cache, the client device, client peer, or other requesting device can access the device that stores the data and obtain the data from that device. As such, the request for the data received at the server computer can be responded to with a hash that can be used to locate a local copy of the data instead of downloading the data from the server computer.

If the client device, the client peer, and/or other requester does not identify the hash and/or the data in the cache, the requester can respond to the server computer with another request. The second request can request the data from the server computer. In some embodiments, the second request includes or is accompanied by a request for a hash corresponding to the requested data. Thus, the requestor can be configured to store the data and/or the hashes at the cache. As such, embodiments of the concepts and technologies disclosed herein can include updating and/or maintaining the cache.

The client device, the client peers, and/or other devices at the branch office or other location also can be configured to update the cache upon uploading the data to the server computer. As such, when a client device or other device with caching enabled uploads an updated file to the server computer, the client device or other device can be configured to request a hash corresponding to the data. The hash can be received from the server computer and stored in the cache and/or an associated cache library. As such, when a first requester attempts to download the updated data, the hashes provided by the server computer can be found in the cache and the data can be obtained locally, without the operations described above for obtaining the data, the hashes, and/or storing the data and hashes in the distributed cache.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and in which are shown by way of illustration specific embodiments or examples. Referring now to the drawings, in which like numerals represent like elements throughout the several figures, aspects of a computing system, computer-readable storage medium, and computer-implemented methodology for cache management will be presented.

Referring now to FIG. 1, aspects of one operating environment 100 for the various embodiments presented herein will be described. The operating environment 100 shown in FIG. 1 includes a client device 102. According to various implementations, the client device 102 can be configured to operate as part of or in communication with, a communications network ("network") 104. According to various implementations, the functionality of the client device 102 is provided by a computing device such as, for example, personal computer ("PC") such as a desktop, tablet, or laptop computer system. The functionality of the client device 102 also may be provided by other types of computing devices including, but not limited to, server computers, handheld computers, netbook computers, embedded computer systems, personal digital assistants, mobile telephones, smart phones, or other computing devices. Thus, while the client device 102 is described herein as a personal computing device such as a desktop or laptop computer, it should be understood that this embodiment is illustrative, and should not be construed as being limiting in any way.

The client device 102 can be configured to execute an operating system 106 and one or more application programs such as, for example, a cache module 108 and/or other application programs. The operating system 106 is a computer program for controlling the operation of the client device 102. The application programs are executable programs configured to execute on top of the operating system 106 to provide the functionality described herein. Although the cache module 108 is illustrated as a component of the client device 102, it should be understood that the cache module 108 may be embodied as or in other stand-alone devices or components thereof. Furthermore, as will be understood with reference to the description below, other devices in addition to, or instead of, the client device 102 can execute the cache module 108. Thus, the illustrated embodiment is illustrative, and should not be construed as being limiting in any way.

The cache module 108 can be configured to save and retrieve data in and from a cache 110. The cache 110, or a portion thereof, can be embodied by data stored at the client device 102 and/or by data stored remote from the client device 102. In other embodiments, portions or components of the cache 110 are provided by multiple devices as a distributed cache. For example, as shown in FIG. 1, the client device 102 and one or more client peers 112A-N (hereinafter collectively and/or generically referred to as "client peers 112") can be configured to collectively store the cache 110 as a distributed cache associated with a branch office, a corporate office, or other branch or portion of a wide area network ("WAN"). Thus, although the cache module 108 and the cache 110 are illustrated only with respect to the client device 102, it should be understood that one or more of the client peers 112 can be configured to execute the cache module 108 and/or to provide data storage associated with the cache 110. As such, the illustrated embodiment should be understood as being illustrative and should not be construed as being limiting in any way.

The cache module 108 also can be configured to communicate with a cache service 114 hosted by a server computer 116 operating as a part of or in communication with the network 104. The server computer 116 can be configured, via execution of the cache service 114, to communicate with the cache module 108 to provide the functionality described herein for cache management. According to various embodiments, the server computer 116 also can be configured to store data 118 and/or hashes 120.

The data 118 stored by the server computer 116 can include any data hosted by the server computer 116. As such, the data 118 can include, for example, Internet content, intranet content, web pages, web sites, applications, files, media content, other data, or the like. According to various implementations of the concepts and technologies disclosed herein, the data 118 includes data elements. As used herein, the term "data elements" includes, but is not limited to, chunks or portions of files or other data. For example, the data elements can be generated in accordance with the MS-FSSHTTP protocol from Microsoft Corporation in Redmond, Wash. It should be understood that this embodiment is illustrative, and should not be construed as being limiting in any way.

The MS-FSSHTTP protocol can be used to break files or other data such as the data 118 into immutable chunks or portions of binary data corresponding to the file and/or associated metadata. As noted above, the these chunks or portions are referred to herein as "data elements" and/or as the data 118. When a file such as the data 118 is requested, the server computer 116 can identify and obtain multiple data elements that can be provided to a requestor individually and/or reassembled to form the file or other data 118 requested by the requestor. Thus, a single file such as a video file can be divided into multiple data elements that collectively represent the single file. Thus, as changes are made to the files, the client device 102 and the client peers 112 can access the data 118 that has changed instead of downloading an entire file.

In some other embodiments, the server computer 116 can be configured to use the data elements to support incremental updates of files or other data 118. As such, when a file is updated, the server computer 116 can be configured to identify data elements reflecting portions of the file that have been changed and can be configured to replace corresponding data elements of previous versions of the file stored by the server computer 116. Thus, updating the files at requestor devices can include incremental updates achieved by providing only the changed data elements. Because incremental updates of files are generally understood, these and other aspects of incrementally updating files and/or the MS-FSSHTTP protocol and/or other protocols are not described in additional detail herein.

According to some embodiments of the concepts and technologies disclosed herein, the server computer 116 is configured to generate cryptographic hashes such as the hashes 120 corresponding to the data elements and to store the hashes 120 at the server computer 116 to provide the functionality described herein for cache management. In particular, the cache service 114 can be configured to receive requests for data 118 that is hosted by the server computer 116. As noted above, the requests for the data 118 can correspond, effectively or explicitly, for one or more data elements. As such, "data 118" as described herein must be understood as including data elements. The requests can be received from the client device 102 and/or the client peers 112. According to various embodiments of the concepts and technologies disclosed herein, the requests include a request for one or more hashes 120 corresponding to the requested data 118.

The server computer 116 can be configured to identify the hashes 120 associated with the requested data 118 and to provide the hashes 120 to the requesting device such as the client device 102 and/or the client peers 112 instead of providing the actual data 118 to the client device 102 and/or the client peers 112. The client device 102 and/or the client peers 112 can execute the cache module 108 to search the cache 110 and/or a cache library (not illustrated) for data referencing the hashes 120 received from the server computer 116. Thus, the cache module 108 can be configured to determine if the client device 102 and/or one of the client peers 112 has previously downloaded, uploaded, and/or otherwise accessed the data 118 associated with the hashes 120 and/or stored data associating the hashes 120 with the data 118.

If the cache module 108 identifies the data 118 and/or the hashes 120 in the cache 110 or the cache library, the cache module 108 can be configured to access the data 118 in the cache 110. As noted above, the cache 110 can include a distributed cache provided by the client device 102 and one or more of the client peers 112. As such, it should be understood that the cache module 108 can be configured to access the data 118 by obtaining the data 118 from one or more of the client device 102 and/or the client peers 112. It should be understood that this embodiment is illustrative, and should not be construed as being limiting in any way.

The cache module 108 also can be configured to build and maintain the cache 110. Thus, for example, if the cache module 108 does not find the hashes 120 and/or the associated data 118, the cache module 108 can be configured to generate a request for the data 118 and transmit the request to the server computer 116. In response to the request, the server computer 116 can transmit the data 118 to the client device 102. The server computer 116 also can transmit the hashes 120 with the data 118, though this is not necessarily the case. As will be explained in more detail below, particularly with reference to FIG. 3, the server computer 116 also can be configured to determine if providing the hashes 120 is less efficient than providing the data 118 and to respond to a request for hashes 120 with the data 118 instead, if appropriate.

Upon receiving the data 118 and/or the hashes 120, the cache module 108 can be configured to store the data 118 and/or the hashes 120 in the cache 110. In some embodiments, the cache module 108 also can store the hashes 120 in a cache library associated with the cache 110, as noted above. As such, future requestors for the data 118, upon searching the cache 110 for the hashes 120 identified by the server computer 116 in response to the request, can identify the hashes in the cache 110 and obtain the data 118. Example embodiments of methods for obtaining the hashes 120, the data 118, and managing the cache 110 are described in more detail below with reference to FIGS. 2-4.

According to various embodiments, the cache module 108 also can be configured to update the cache 110 upon uploading data 118 to the server computer 116. In one embodiment, the cache module 108 can be configured to request and receive hashes 120 from the server computer 116 upon uploading the data 118 to the server computer 116. The cache module 108 also can be configured to store the uploaded data 118 and the received hashes 120 in the cache 110. As such, some embodiments of the concepts and technologies disclosed herein include storing the data 118 and/or hashes 120 in the cache 110 upon creation, thereby obviating the need for a first subsequent requestor to download and store the data 118 in the cache 110. As such, some embodiments can be used to further reduce bandwidth consumed by communications between the branch office and the server computer 116, though the number of roundtrips may be the same or greater, in some instances. It should be understood that this embodiment is illustrative, and should not be construed as being limiting in any way.

According to the concepts and technologies described herein, the server computer 102 cart be configured to communicate with the client device 102 and the client peers 112 at a branch office or other location. The client device 102 and one or more of the client peers 112 can be configured to execute a cache module 108. The cache module 108 can be executable to generate and/or maintain a cache 110 and/or a cache library. The cache 110 can be used to store data 118 downloaded from and/or uploaded to the server computer 116 and can be a distributed cache provided by the client device 102 and the client peers 112.

The server computer 116 can be configured to receive requests the data 118 stored at the server computer 116. The request can include and/or can be accompanied by a request for the hashes 120 corresponding to the data 118. The server computer 116 can respond to the request with the hashes 120 that correspond to the requested data 118, unless this response would be less efficient than providing the data 118, as explained above. The client device 102 can search the cache 110 to determine if any device at the branch office or other location previously has accessed the data 118 associated with the hashes 120. If the hashes 120 and/or the data 118 are determined to exist in the cache 110, the client device 102 can access the device that stores the data 118 and obtain the data 118. As such, the request for the data 118 received at the server computer 116 can be responded to with a hash 120 that can be used by the client device 102 to locate a local copy of the data 118 instead of downloading the data 118 from the server computer 116.

If the client device 102 does not identify the hash 120 and/or the data 118 in the cache 110, the client device 102 can generate a request for the data 118 and transmit the request to the server computer 116. In some embodiments, the second request includes or is accompanied by a request for a hash 120 corresponding to the requested data 118. Thus, the client device 102 can be configured to store the data 118 and/or the hashes 120 at the cache 110 to maintain and/or manage the cache 110. According to various embodiments, the client device 102 also can be configured to update the cache 110 upon uploading data 118 to the server computer 116. The client device 102 can be configured to request a hash 120 corresponding to the data 118 uploaded by the client device 102. The hash 120 can be received from the server computer 116 and stored in the cache 110. As such, when a subsequent requestor attempts to download the data 118 from the server computer 116, and receives the hashes 120 from the server computer 116, the requestor can identify the hashes 120 in the cache 110 and the obtain the data 118 locally.

FIG. 1 illustrates one client device 102, one network 104, multiple client peers 112, and one server computer 116. It should be understood, however, that some implementations of the operating environment 100 include multiple client devices 102, multiple networks 104, a single client peer 112, and/or multiple server computers 116. Thus, the illustrated embodiments should be understood as being illustrative, and should not be construed as being limiting in any way.

Figure 2:
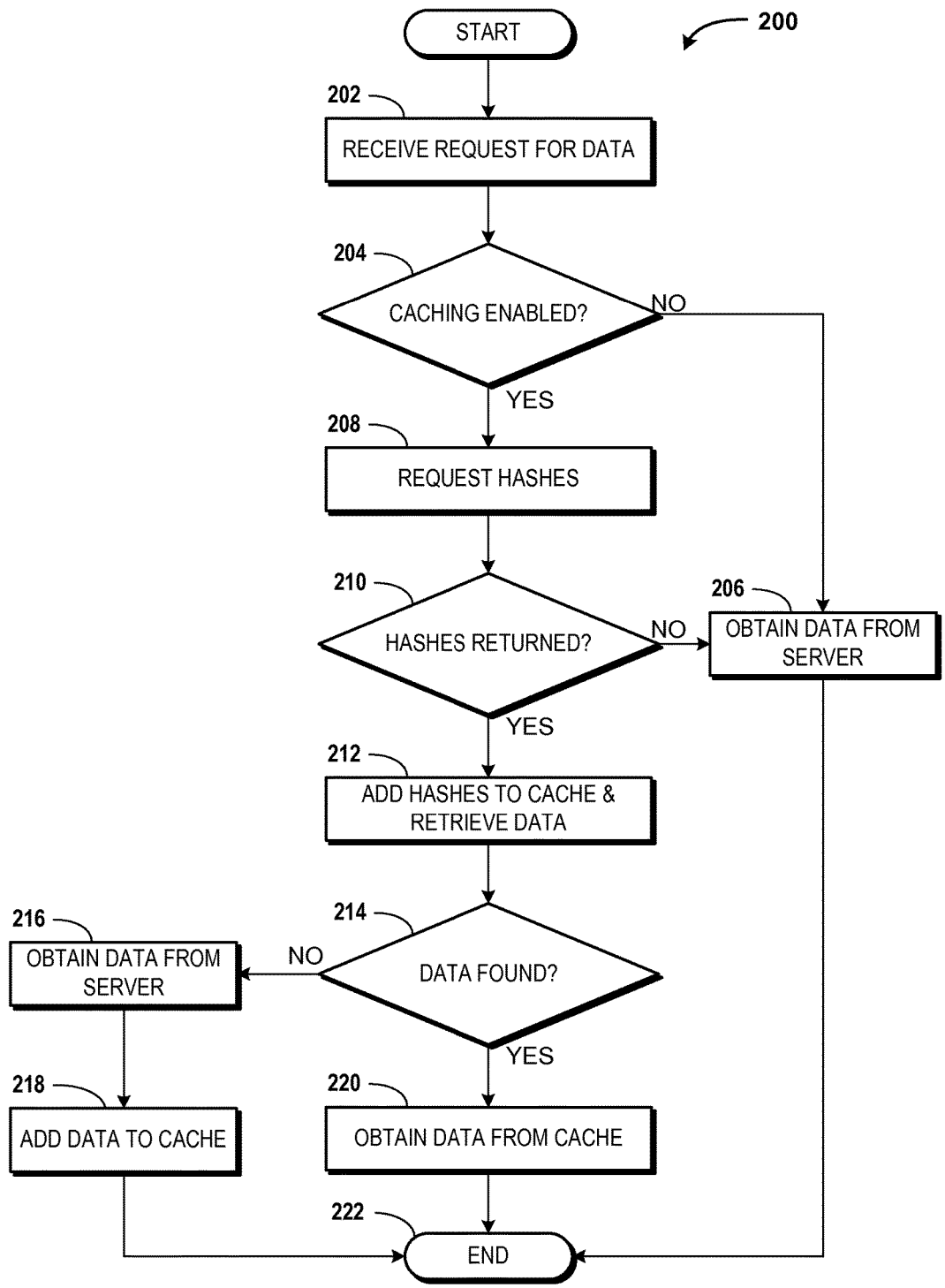
FIG. 2 is a flow diagram showing aspects of a method for managing an integrated cache, according to an illustrative embodiment.

Turning now to FIG. 2, aspects of a method 200 for managing an integrated cache will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can be ended at any time and need not be performed in their respective entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For purposes of illustrating and describing the concepts of the present disclosure, the method 200 is described as being performed by the client device 102 via execution of the cache module 108. It should be understood that this embodiment is illustrative, and should not be viewed as being limiting in any way. In particular, various devices including, but not limited to, the client device 102 can be configured to provide the functionality described herein with regard to the method 200 via execution of various software modules including, but not limited to, the cache module 108.

The method 200 begins at operation 202, wherein the client device 102 receives a request for the data 116 hosted by the server computer 116. The request for the data 116 can include input received at the client device 102 for accessing a file including, but not limited to, navigating to a file in a directory, detecting selection of a link or other identifier associated with the data 116, and/or otherwise receiving a request for the data 116. The data 116 requested in operation 202 can correspond to almost any type of data including, but not limited to, web pages, web applications, web sites, documents, text, spreadsheets, mail data, video, audio, or other media content, other data, and/or combinations thereof.

From operation 202, the method 200 proceeds to operation 204, wherein the client device 102 determines if caching is enabled. In some embodiments, determining if caching is enabled includes determining if a user, administrator, or other authorized user has enabled a cache mode. Thus, the functionality of operation 294 can correspond, in some embodiments, to an "opt-in" or "opt-out" operation at the client device 102, wherein the client device 102 elects to use the cache mode (opt-in) or elects not to use the cache mode (opt-out). Thus, in some embodiments operation 204 includes determining if both the client device 102 and the server computer 116 agree to use hashes 120. If either of the client device 102 or the server computer 116 declines to use the hashes 120, the client device 102 can determine that hash mode is not enabled and can instead rely upon sharing the actual data 118. In other embodiments, determining if caching is enabled includes determining if a software setting or functionality includes use of a cache mode. In one contemplated embodiment, the client device 102 can determine, in operation 204, if the client device 102 and/or the server computer 116 are configured to provide the BRANCH-CACHE service provided by some members of the WINDOWS and WINDOWS SERVER COMPUTER families of operating systems from Microsoft Corporation in Redmond, Wash. It should be understood that these embodiments are illustrative, and should not be construed as being limiting in any way.

If the client device 102 determines, in operation 204, that caching is not enabled, the method 200 proceeds to operation 206. At operation 206, the client device 102 obtains the data 118 from the server computer 116. As such, it can be appreciated that in operation 206, the client device 102 can request the data 118 in a traditional manner. Similarly, although not shown in FIG. 2, the server computer 116 can respond to the request in a traditional manner.

If the client device 104 determines, in operation 204, that caching is enabled, the method 200 proceeds to operation 208. In operation 208, the client device 102 generates a request for hashes 120 from the server computer 116. The request for the hashes 120 can be included in a request for the data 118. As such, the client device 102 can be configured to request the data 118 with a flag, field, or other indicator that effectively informs the server computer 116 that the data 118 is requested, and that the hashes 120, if available, are to be provided. In some other embodiments, the client device 102 can generate a request for the hashes 120, and the server computer 116 can determine if the hashes 120 or the data 118 are to be provided in response to the request. Some aspects of the functionality of the server computer 116 for determining if the data 118 or the hashes 120 are to be provided are described below in more detail with reference to FIG. 3.

From operation 208, the method 200 proceeds to operation 210, wherein the client device 102 determines if the hashes 120 requested in operation 208 are returned by the server computer 116. Thus, the client device 102 can determine, in operation 210, if the requested hashes 120 were available or unavailable at the server computer 116. If the client device 102 determines, in operation 210, that the hashes 120 are not returned by the server computer 116, the method 200 can proceed to operation 206 described above. As such, the client device 102 can be configured to request the data 118 from the server computer 116 in response to determining that the hashes 120 were not returned by the server computer 116. Thus, the client device 102 can be configured to determine that if the server computer 116 has determined that it is more efficient to provide the data 118 to the client device 102, relative to the hashes 120. This will be explained in more detail below with reference to FIG. 3.

If the client device 102 determines, in operation 210, that the hashes 120 are returned by the server computer 116, the method 200 proceeds to operation 212. In operation 212, the client device 102 adds the returned hashes 120 to the cache 110. As such, the client device 102 can be configured to maintain and/or update the cache 110 in response to receiving data from the server computer 116. Thus, the cache 110 can be updated when data 118 is retrieved from the server computer 116.

From operation 212, the method 200 proceeds to operation 214, wherein the client device 102 examines the cache 110 to determine if the cache 110 includes data 118 corresponding to the hashes 120 obtained in operation 210. Thus, it can be appreciated that the client device 102 can determine, in operation 214, if one or more of the client peers 112 or other devices sharing or providing the cache 110 have previously retrieved the data 118 requested in operation 202.

If the client device 102 determines, in operation 214, that the data 118 corresponding to the hashes 120 obtained in operation 210 is not available, the method 200 can proceed to operation 216. In operation 216, the client device 102 can generate a new request for the data 118 corresponding to the hashes 120 from the server computer 116. As such, the client device 102 can determine that the data 118 has not previously been accessed or downloaded by the client device 102, the client peers 112, and/or other devices using or accessing the cache 110. Thus, the client device 102 can download the data 118 and store the data in the cache 110.

From operation 216, the method 200 can proceed to operation 218. At operation 218, the client device 102 can store the data 118 in the cache 110, as mentioned above. The client device 102 also can store the hashes 120 received in operation 210 in a cache library and/or in the cache 110. Thus, when the client device 102 or other devices search the cache 110 for the hashes 120 in subsequent iterations of the method 200, the data 118 can be located and used instead of obtaining the data 118 from the server computer 116.

It can be appreciated from the above description of FIG. 2 that latency and/or inefficiencies may be experienced by the client computer 102 the first time a particular instance of the data 118 is requested from the server computer 116. In subsequent requests for the data 118, however, the concepts and technologies disclosed herein for cache management can be used to realize increased efficiency in obtaining the data 118 using less bandwidth or other resources, and with less latency, between the server computer 116 and one or more of the client device 102 or the client peers 112, as is described herein.

In particular, if the client device 102 determines, in operation 214, that the data 118 corresponding to the hashes 120 obtained in operation 210 is available, the method 200 proceeds to operation 220. In operation 220, the client device 102 obtains the data 118 from the cache 110. As such, the client device 102 can obtain the data 118 from local peers such as the client peers 112 and therefore may not need to download the data 118 from the server computer 116. When the concepts and technologies disclosed herein are extended to an enterprise site such as a branch office or other similar location, the impact of using the concepts and technologies disclosed herein for cache management can be appreciated.

In one contemplated example, a presentation can be modified by a user associated with the branch office and saved to the server computer 116 for distribution and/or download by various peers. In this example, the branch office includes twenty five users, and the modification to the presentation can include embedding of a video file having a size of twenty megabytes. Thus, a minimum of five hundred megabytes of bandwidth will be consumed if all of the users at the branch office update their versions of the presentation. In accordance with various embodiments of the concepts and technologies disclosed herein, these users can instead obtain the data from the peer at the branch office who originally uploaded the data to the server computer 116. Because only hashes 120 are being transmitted between the server computer 116 and the peers, substantially less bandwidth may be used.

In the above example, because the uploading peer can store the data 118 in the cache 110 when uploaded, as will be explained in more detail below with reference to FIG. 4, none of the twenty five peers may be required to download the video data from the server computer 116. Thus, the twenty five users instead can obtain the hashes 120 from the server computer 116 and can subsequently obtain the data 118 from the cache 110. As is generally understood, the hashes 120 can be sized in terms of bits or bytes, as opposed to megabytes. Thus, the total bandwidth between the peers and the server computer 116, when exchanging information to download the twenty-five instances of the video data from the cache 110 in this example, can be reduced from over five hundred megabytes to several hundred kilobytes. Thus, it can be appreciated that the concepts and technologies disclosed herein for cache management can help realize substantial reductions of bandwidth consumption and, as a result, operating costs associated with the branch office in this example.

From operation 220, the method 200 proceeds to operation 222. Similarly, the method 200 can proceed to operation 222 from operation 206. The method 200 also can proceed to operation 222 from operation 218. The method 200 ends at operation 222.

Figure 3:
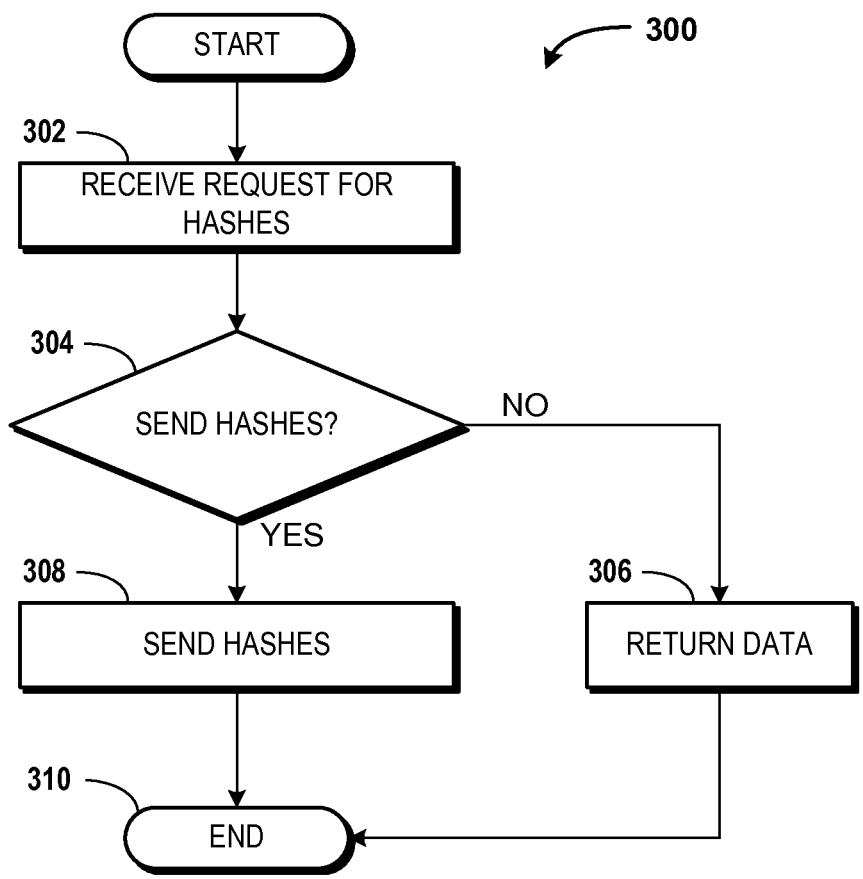
FIG. 3 is a flow diagram showing aspects of a method for providing data using an integrated cache, according to an illustrative embodiment.

Turning now to FIG. 3, aspects of a method 300 for providing data using an integrated cache are presented, according to an illustrative embodiment. For purposes of illustrating and describing the concepts of the present disclosure, the method 300 is described as being performed by the server computer 116 via execution of computer-executable instructions for providing the cache service 114 described herein. It should be understood that this embodiment is illustrative, and should not be viewed as being limiting in any way. In particular, various devices including, but not limited to, the server computer 116 can be configured to provide the functionality described herein with regard to the method 300 via execution of various software modules including, but not limited to, the cache service 114.

The method 300 begins at operation 302, wherein the server computer 116 receives a request for the hashes 120. In some embodiments, the request received in operation 302 may, but does not necessarily, correspond to a request generated by the client device 102 such as that described above with reference to operation 208 of FIG. 2, in some embodiments, the client device 102 or other device requests the hashes 120 via an explicit request for the hashes 120 and in other embodiments, the hashes 120 are requested as part of a request for data 118. Thus, the request received in operation 302 can include a request for data 118 with a flag or other functionality for requesting the hashes 120.

From operation 302, the method 300 proceeds to operation 304, wherein the server computer 116 determines if the hashes 120 requested in operation 302 are to be sent. According to various embodiments, the server computer 116 can determine, for example, the size of the hashes 120, the size of the data 118 associated with the hashes 120, the time required to generate the hashes 120 (if the hashes are not yet stored by the server computer 116), and/or other information. Thus, the server computer 116 can consider not only the size of the data 118 and/or the hashes 120, but also the time required to provide the data 118 and/or the hashes 120.

The server computer 116 can compare the sizes and times associated with generating and/or providing the hashes 120 versus providing the data 118. Based upon this comparison and/or other information, the server computer 116 can be configured to determine if it is more efficient to provide the hashes 120 or the data 118. Also, as noted above, the hashes 120, if provided to the client device 102, will then be used to search the cache 110 for the data 118. Thus, the server computer 116 also can take into account the multiple communications that may be required between the client device 102 and the server computer 116 if the data 118 is not stored at the cache 110. For example, if the data 118 is close in size to the size of the hashes 120, the server computer 116 can be configured to provide the data 118 instead of or in addition to, the hashes 120 based upon an assumption that providing the data 118 will be more efficient. The server computer 116 also can be configured to store data or flags associated with the data 118 for indicating if hashes 120 are to be provided in the future.

If the server computer 116 determines, in operation 304, that the hashes 120 are not to be sent, the method 300 proceeds to operation 306. At operation 306, the server computer 116 can send the data 118 to the client device 102 instead of the hashes 120. As mentioned above, the server computer 116 also can send the hashes 120 with the data 118, if desired, so that the hashes 120 and the data 118 can be stored at the cache 110, though this is not necessarily the case.

If the server computer 116 determines, in operation 304, that the hashes 120 are to be sent, the method 300 proceeds to operation 308. At operation 308, the server computer 116 can send the hashes 120 to the client device 102. From operation 308, the method 300 proceeds to operation 310. The method 300 also can proceed to operation 310 from operation 306. The method 300 ends at operation 310.

Figure 4:
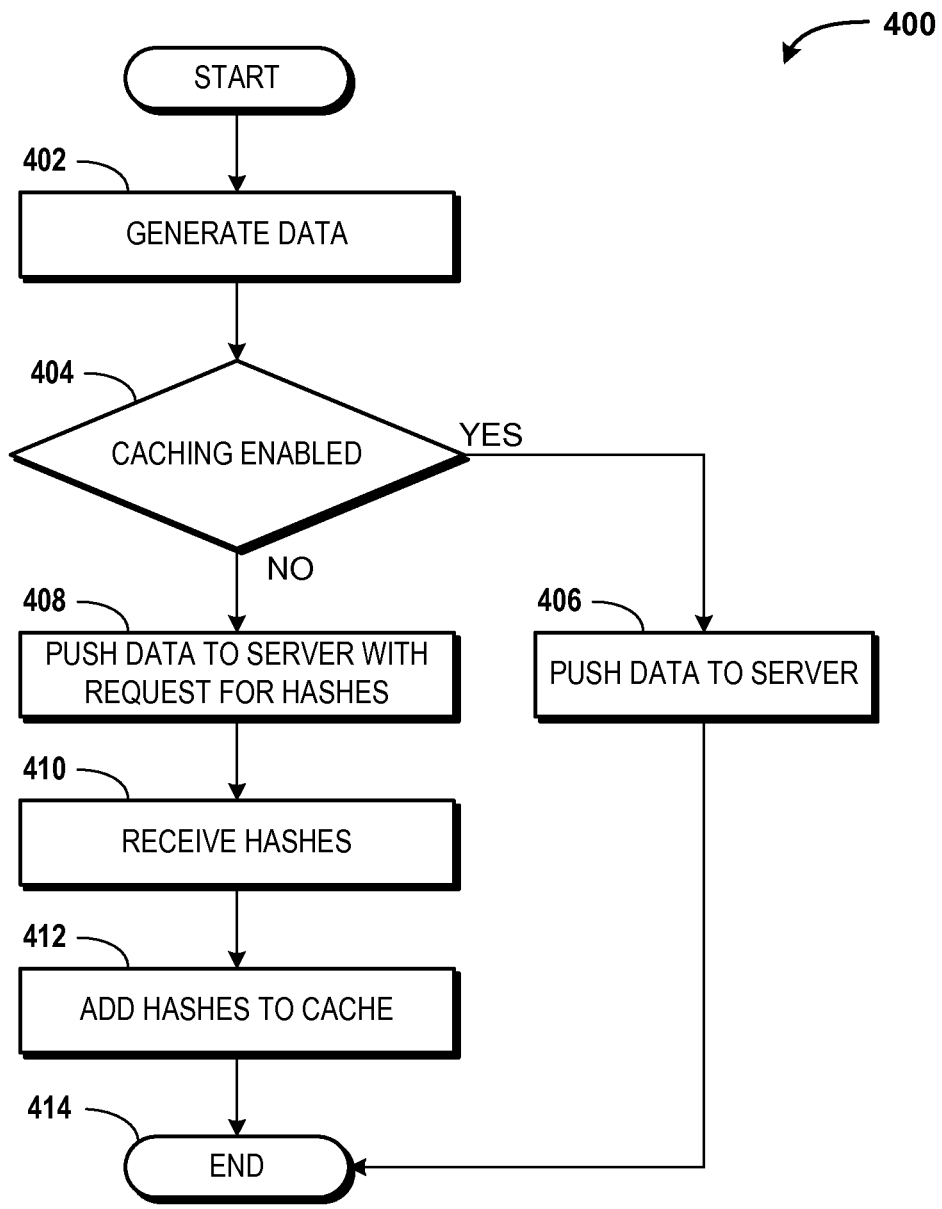
FIG. 4 is a flow diagram showing aspects of a method for uploading data to a cache service, according to an illustrative embodiment.

Turning now to FIG. 4, aspects of a method 400 for uploading data to a cache service are presented, according to an illustrative embodiment. For purposes of illustrating and describing the concepts of the present disclosure, the method 400 is described as being performed by the client device 102 via execution of the cache module 108. It should be understood that this embodiment is illustrative, and should not be viewed as being limiting in any way. In particular, various devices including, but not limited to, the client device 102 can be configured to provide the functionality described herein with regard to the method 400 via execution of various software modules including, but not limited to, the cache module 108.

The method 400 begins at operation 402, wherein the client device 102 detects or determines that uploading of data 118 generated at the client device 102 has been requested or commenced. Thus, for example, the client device 102 can detect initiation of a file transfer from the client device 102 such as, for example, saving a file or other type of the data 118 to the server computer 116. According to various embodiments, the client device 102 can be configured to detect transfer of the data 118. In some other embodiments, the client device 102 can be configured to provide an option to a user associated with the client device 102 for using the functionality described herein for cache management when the data 118 is uploaded or otherwise transferred. As such, operation 402 can include receiving selection of an option or other functionality for providing the functionality described herein with respect to FIG. 4.

From operation 402, the method 400 proceeds to operation 404, wherein the client device 102 determines if caching is enabled. In some embodiments, determining if caching is enabled as shown in operation 404 can be, but is not necessarily, similar or even identical to the functionality described above with respect to operation 204 of FIG. 2. If the client device 102 determines, in operation 404, that caching is not enabled, the method 400 proceeds to operation 406. At operation 406, the client device 102 can push the data 118 generated in operation 402 to the server computer 116. Thus, if the client device 102 determines that caching is not enabled, the data 118 can be transmitted to the server computer 116 in a traditional manner, if desired.

If the client device 102 determines, in operation 404, that caching is enabled, the method 400 proceeds to operation 408. In operation 408, the client device 102 pushes the data 118 generated in operation 402 to the server computer 116 with a request to generate and return hashes 120 corresponding to the data 118. The request to return the hashes 120 can be included with the data 118 as a flag or other indicator associated with a request to store the data 118. In some other embodiments, the request for the hashes 120 can be generated by the client device 102 as a separate request. Regardless of how the request is sent to the server computer 116, the server computer 116 can be configured to recognize the request for the hashes 120 and generate the hashes 120 in response to the request.

From operation 408, the method 400 proceeds to operation 410, wherein the client device 102 receives the hashes 120 from the server computer 116. From operation 410, the method 400 proceeds to operation 412, wherein the client device 102 adds the hashes 120 received in operation 408 to the cache 110. As explained above, the hashes 120 and/or data for associating the hashes 120 with the data 118 and/or identifying locations at which the data 118 is stored can also be stored in a cache library associated with the cache 110. As such, it can be appreciated that the client device 102 can be configured to maintain the cache 110 during creation of the data 118 as well as, or instead of, during a first download of the data 118 from the server computer 116 as described above with reference to FIG. 2.

Thus, it can be appreciated that some embodiments of the concepts and technologies disclosed herein can update the cache 110 with the data 118 and the hashes 120 during uploading of the data 118, thereby obviating a first download of the data 118, request for the hashes 120, and/or storing of the data 118 and/or the hashes as described above. From operation 412, the method 400 proceeds to operation 414. The method 400 also can proceed to operation 414 from operation 406. The method 400 ends at operation 414.

While the above description has referred to requests for data 118 from a client device 102, it should be understood that this embodiment is only one example of the concepts and technologies disclosed herein. In particular, in some embodiments, the client device 102 can be a proxy device for obtaining and/or caching the data 118. As such, a client device 102 in some embodiments may function as a service in some contexts. Thus, as noted above with reference to FIG. 1, the functionality of the client device 102 can be provided by a real or virtual server computer. As such, the described embodiments should be understood as illustrative and should not be construed as being limiting in any way.

Figure 5:
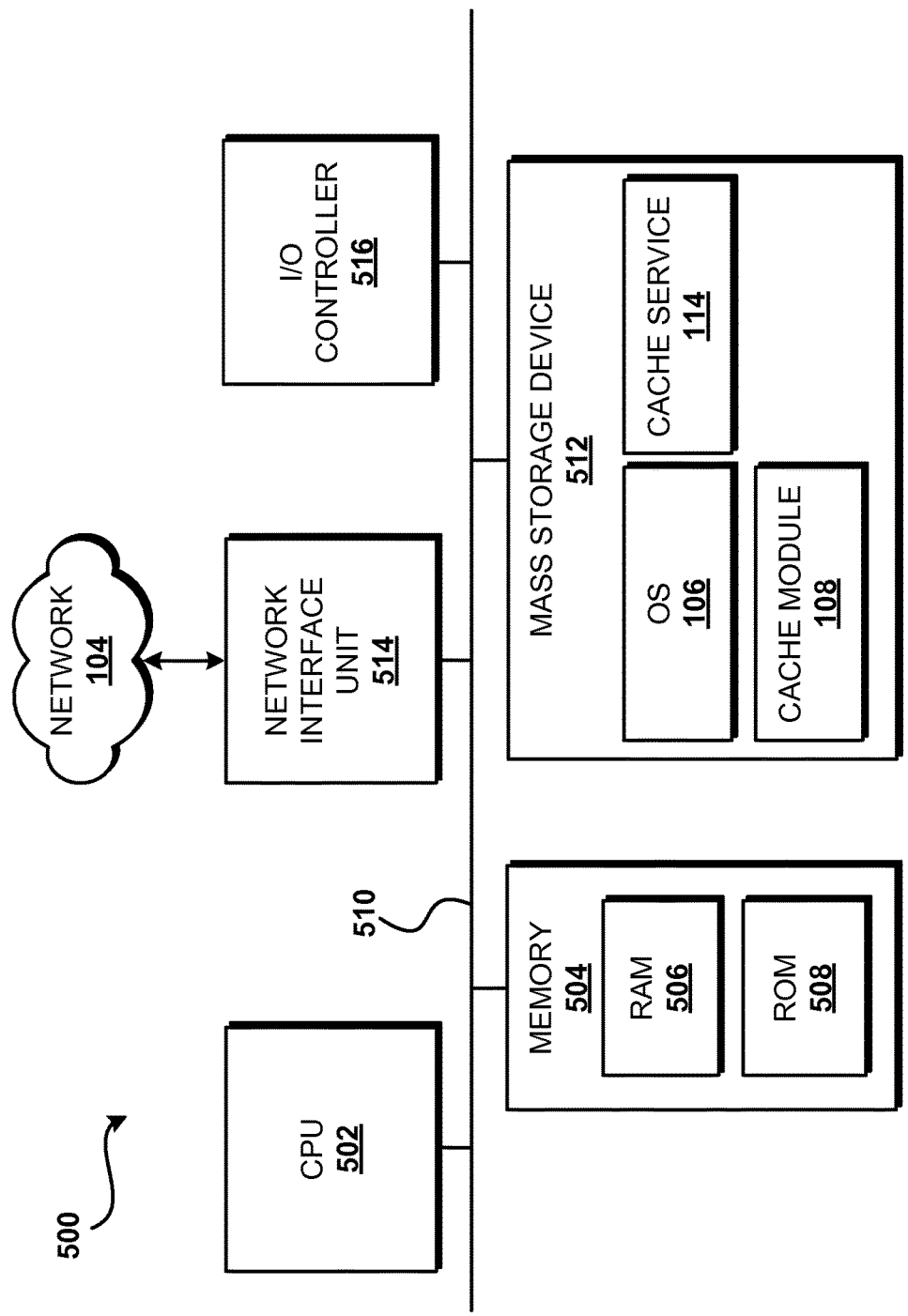
FIG. 5 is a computer architecture diagram illustrating art illustrative computer hardware and software architecture for a computing system capable of implementing aspects of the embodiments presented herein.

FIG. 5 illustrates an illustrative computer architecture 500 for a device capable of executing the software components described herein for cache management. Thus, the computer architecture 500 illustrated in FIG. 5 illustrates an architecture for a server computer, a mobile phone, a PDA, a smart phone, a desktop computer, a netbook computer, a tablet computer, and/or a laptop computer. The computer architecture 500 may be utilized to execute any aspects of the software components presented herein.

The computer architecture 500 illustrated in FIG. 5 includes a central processing unit 502 ("CPU"), a system memory 504, including a random access memory 506 ("RAM") and a read-only memory ("ROM") 508, and a system bus 510 that couples the memory 504 to the CPU 502. A basic input/output system containing the basic routines that help to transfer information between elements within the computer architecture 500, such as during startup, is stored in the ROM 508. The computer architecture 500 further includes a mass storage device 512 for storing the operating system 106 and the cache module 108. Although not shown in FIG. 5, the mass storage device 512 also can be configured to store the cache 110, the cache server computer 114, the data 118, the hashes 120, and/or other data, if desired.

The mass storage device 512 is connected to the CPU 502 through a mass storage controller (not shown) connected to the bus 510. The mass storage device 512 and its associated computer-readable media provide non-volatile storage for the computer architecture 500. Although the description of computer-readable media contained herein refers to a mass storage device, such as a hard disk or CD-ROM drive, it should be appreciated by those skilled in the art that computer-readable media can be any available computer storage media or communication media that can be accessed by the computer architecture 500.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a) wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 500. For purposes the claims, the phrase "computer storage medium" and variations thereof, does not include waves, signals, and/or other transitory and/or intangible communication media, per se.

According to various embodiments, the computer architecture 500 may operate in a networked environment using logical connections to remote computers through a network such as the network 104. The computer architecture 500 may connect to the network 104 through a network interface unit 514 connected to the bus 510. It should be appreciated that the network interface unit 514 also may be utilized to connect to other types of networks and remote computer systems, for example, the client peers 112 and/or other devices. The computer architecture 500 also may include an input/output controller 516 for receiving and processing input from a number of other devices, including a keyboard, mouse, or electronic stylus (not shown in FIG. 5). Similarly, the input/output controller 516 may provide output to a display screen, a printer, or other type of output device (also not shown in FIG. 5).

It should be appreciated that the software components described herein may, when loaded into the CPU 502 and executed, transform the CPU 502 and the overall computer architecture 500 from a general-purpose computing system into a special-purpose computing system customized to facilitate the functionality presented herein. The CPU 502 may be constructed from any number of transistors or other discrete circuit elements, which may individually or collectively assume any number of states. More specifically, the CPU 502 may operate as a finite-state machine, in response to executable instructions contained within the software modules disclosed herein. These computer-executable instructions may transform the CPU 502 by specifying how the CPU 502 transitions between states, thereby transforming the transistors or other discrete hardware elements constituting the CPU 502.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 500 in order to store and execute the software components presented herein. It also should be appreciated that the computer architecture 500 may include other types of computing devices, including hand-held computers, embedded computer systems, personal digital assistants, and other types of computing devices known to those skilled in the art. It is also contemplated that the computer architecture 500 may not include all of the components shown in FIG. 5, may include other components that are not explicitly shown in FIG. 5, or may utilize an architecture completely different than that shown in FIG. 5.

Based on the foregoing, it should be appreciated that technologies for cache management have been disclosed herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

We claim:

1. A computer-implemented method for managing a cache, the computer-implemented method comprising performing computer-implemented operations at a client device for:
   receiving, at the client device, a request to obtain data stored at a server computer;
   determining, by the client device, that caching is enabled at the client device based upon at least one of:
      a user-selectable cache mode being enabled, or
      the client device having a cache mode;
   requesting, by the client device, the data stored at the server computer;
   in response to the request for the data stored at the server, receiving hashes corresponding to the data instead of the requested data;
   searching the cache for the hashes by:
      determining that the hashes are received from the server computer, each of the requested hashes comprising unique data corresponding to the requested data; and
      accessing the cache; and
   in response to a determination that the cache does not include the hashes:
      determining whether one or more local peers in communication with the client device has the data corresponding to the hashes;
      determining which local peers have which portions of the data corresponding to the hashes; and
      requesting respective portions of the data from the identified local peers.

2. The method of claim 1, wherein searching the cache for the hashes comprises:
   receiving the hashes from the server computer; and
   in response to determining that the cache does not store the hashes,
      generating a request for the data and for the hashes, and
      storing the data and the hashes in the cache.

3. The method of claim 1, wherein searching the cache for the hashes comprises:
   in response to identifying the hashes in the cache, obtaining the data from the cache.

4. The method of claim 3, wherein the cache comprises a distributed cache provided by the client device and a client peer, and wherein obtaining the data from the cache comprises obtaining the data from the client peer.

5. The method of claim 4, wherein the client device and the client peer are located on a network with constrained bandwidth.

6. The method of claim 1, further comprising
   generating new data at the client device;
   uploading the new data to the server computer with a request for a hash corresponding to the new data;
   receiving the hash from the server computer; and
   storing the hash and the new data in the cache.

7. A client computer system:
   a network interface unit in the client computer system;
   a memory device in the client computer system, the memory device containing computer readable instructions; and
   a processor in the client computer system, the processor communicatively coupled to the memory device and to the network interface unit, the processor executing the computer readable instructions to:
      receive via the network interface unit a request to obtain data stored at a server computer;
      determine whether caching is enabled at the client computer system and the server computer;
      in response to determining that caching is not enabled at the client computer system and the server computer based upon a refusal to use a hash by the client computer system and the server computer, request, via the network interface unit, the data from the server computer;
      in response to determining that caching is enabled at the client computer system based upon at least one of a user-selectable cache mode being enabled or the client computer system having a cache mode, and at the server computer based upon the server computer having the cache mode:
         request, via the network interface unit, hashes from the server computer, the hashes corresponding to the data;
         search a cache for the hashes by:
            determining that the hashes are received from the server computer, each of the requested hashes comprising unique data corresponding to the requested data; and
            accessing the cache;
         in response to a determination that the cache does not include the hashes:
            determine whether one or more local peers in communication with the client device has the data corresponding to the hashes;
            determine which local peers have which portions of the data corresponding to the hashes; and
            request respective portions of the data from the identified local peers.

8. The client computer system of claim 7, wherein the memory device further comprises computer readable instructions that, when executed by the processor, cause the processor to:
   determine whether the cache stores the data;
   in response to determining that the cache does not store the hash:
      generate a request for the data from the server computer, and
      store the data and the hash in the cache.

9. The client computer system of claim 8, wherein the memory device further comprises computer readable instructions that, when executed by the processor, cause the processor, in response to identifying the hash in the cache, to:
   obtain the data from the cache.

10. The client computer system of claim 9, wherein the cache comprises a distributed cache provided by the client computer system and a client peer, and wherein obtaining the data from the cache comprises obtaining the data from the client peer.

11. The client computer system of claim 10, wherein the client computer system and the client peer are located at a branch office, and wherein the server computer is located remote from the branch office.

12. The client computer system of claim 7, wherein the memory device further comprises computer readable instructions that, when executed by the processor, cause the processor to:
   generate new data at the client computer system;
   upload, via the network interface unit, the new data to the server computer with a request for a new hash corresponding to the new data;
   receive, via the network interface unit, the new hash from the server computer; and
   store the new hash and the new data in the cache.

13. A computer-implemented method for managing a cache of data, the computer-implemented method comprising performing computer-implemented operations at a server for:
   receiving a request for a hash from a client device;
   determining that caching is enabled at the client device based on a user-selectable cache mode being enabled;
   determining whether to send the hash or data corresponding to the hash based upon at least one of: a size of the data compared to a size of the hash, a time required to generate the hash if the hash is not already stored at the server, or a number of communications required between the client device and the server if the data is not stored in the cache, wherein determining whether to send the hash or the data based on the number of required communications comprises determining the number of communications required between the client and the server if the data is not stored in the cache;
   if it is determined to send the hash then sending the hash to the client device, wherein:
      if the determination whether to send the hash or data is based on the number of communications required between the client device and the server, then sending the hash if fewer communications to send the hash are required relative to the number of communications required to send the data; and
   if it is determined to send the data, then sending the data to the client device.

14. The computer-implemented method of claim 13, wherein the request for the hash from the client device comprises a request for data and a flag indicating that a hash should be sent, and the computer-implemented operations further comprise:
   if the flag is present, then proceeding to the determining operation; and
   if the flag is not present, then sending the data to the client device.

15. The computer-implemented method of claim 13 wherein the determining operation comprises:
   comparing the size of the hash with the size of the data;
   sending the data if that is more efficient than sending the hash; and
   sending the hash if that is more efficient than sending the data.

16. The computer-implemented method of claim 15 and further comprising sending the data if the size of the data is approximately the size of the hash.

17. The computer-implemented method of claim 15 and further comprising storing a flag to indicate that the hash is to be provided in response to a future request from the client device.

18. The computer-implemented method of claim 13 wherein the determining operation comprises:
   determining the time required to generate the hash if the hash is not already stored at the server;
   generating the hash and sending the hash if that is more time-efficient than sending the data; and
   sending the data if that is more time-efficient than generating and sending the hash.

* * * * *